United States Patent
Yano et al.

(10) Patent No.: US 11,802,790 B2
(45) Date of Patent: Oct. 31, 2023

(54) OPTICAL FIBER CABLE FOR SOUND WAVE SENSING

(71) Applicant: NEC Corporation, Tokyo (JP)

(72) Inventors: Yutaka Yano, Tokyo (JP); Eitaro Misumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/617,405

(22) PCT Filed: Jan. 21, 2020

(86) PCT No.: PCT/JP2020/001900
§ 371 (c)(1),
(2) Date: Dec. 8, 2021

(87) PCT Pub. No.: WO2020/250478
PCT Pub. Date: Dec. 17, 2020

(65) Prior Publication Data
US 2022/0178740 A1    Jun. 9, 2022

(30) Foreign Application Priority Data
Jun. 12, 2019   (JP) ................................. 2019-109437

(51) Int. Cl.
*G01H 9/00*    (2006.01)
*G02B 6/44*    (2006.01)

(52) U.S. Cl.
CPC ............. *G01H 9/004* (2013.01); *G02B 6/443* (2013.01); *G02B 6/4405* (2013.01); *G02B 6/44384* (2023.05)

(58) Field of Classification Search
CPC ...... G01H 9/004; G02B 6/4405; G02B 6/443; G02B 6/4494; G02B 6/4415
See application file for complete search history.

(56) References Cited

U.S. PATENT DOCUMENTS

| | | |
|---|---|---|
| 4,524,436 A | 6/1985 | Hall et al. |
| 7,896,068 B2 | 3/2011 | Dria et al. |

(Continued)

FOREIGN PATENT DOCUMENTS

| | | |
|---|---|---|
| CN | 1675570 A | 9/2005 |
| GB | 2188719 A | 10/1987 |

(Continued)

OTHER PUBLICATIONS

International Search Report for PCT Application No. PCT/JP2020/001900, dated Feb. 25, 2020.

(Continued)

*Primary Examiner* — John Bedtelyon
(74) *Attorney, Agent, or Firm* — Sughrue Mion, PLLC

(57) ABSTRACT

An optical fiber cable for sound wave sensing that uses a straight optical fiber and is capable of suppressing directivity is provided. The optical fiber cable for sound wave sensing includes a cover part (10) that is capable of covering a straight cable core (11) and is provided with a sound wave refraction part (12) which refracts sound waves made incident roughly perpendicularly to a longitudinal direction of the cable core (11) and makes the sound waves be incident diagonally to the longitudinal direction of the cable core (11). The cover part (10) includes a gap filling part (23) which covers the sound wave refraction part (12).

6 Claims, 13 Drawing Sheets

(56) References Cited

U.S. PATENT DOCUMENTS

| | | |
|---|---|---|
| 2006/0152735 A1 | 7/2006 | Kageyama et al. |
| 2012/0111104 A1 | 5/2012 | Taverner et al. |
| 2012/0227504 A1 | 9/2012 | Goldner et al. |
| 2014/0345388 A1 | 11/2014 | Den Boer et al. |
| 2016/0223389 A1 | 8/2016 | Farhadiroushan et al. |
| 2017/0292662 A1 | 10/2017 | Godfrey |
| 2017/0292862 A1* | 10/2017 | Godfrey ............... G02B 6/4415 |
| 2017/0370767 A1 | 12/2017 | Den Boer et al. |

FOREIGN PATENT DOCUMENTS

| | | |
|---|---|---|
| JP | 2003-293682 A | 10/2003 |
| JP | 2004-101414 A | 4/2004 |
| WO | 03/002956 A1 | 1/2003 |
| WO | 2013/090544 A1 | 6/2013 |
| WO | 2018/222541 A1 | 12/2018 |

OTHER PUBLICATIONS

Extended European Search Report for EP Application No. EP20823351.0 dated Jun. 14, 2022.

CN Office Action for CN Application No. 202080042572.X, dated Aug. 23, 2023 with English Translation.

\* cited by examiner

OPTICAL FIBER CABLE FOR SOUND WAVE SENSING

This application is a National Stage Entry of PCT/JP2020/001900 filed on Jan. 21, 2020, which claims priority from Japanese Patent Application 2019-109437 filed on Jun. 12, 2019, the contents of all of which are incorporated herein by reference, in their entirety.

TECHNICAL FIELD

The present invention relates to a structure of an optical fiber cable in which sound wave sensing use is taken into consideration.

BACKGROUND ART

In recent years, a method of monitoring sound and vibrations using an optical fiber called DAS (Distributed Acoustic Sensing) has been developed. When sound waves are applied to the optical fiber through which light is passing, the light passing through the part is modulated. Therefore, by observing modulation of reflected light and transmitted light inside the optical fiber, the sound waves around the optical fiber can be monitored.

The sound waves advancing roughly in parallel with a longitudinal direction of the optical fiber more easily modulate the light passing through inside the optical fiber compared to the sound waves advancing roughly perpendicularly to the longitudinal direction. Therefore, when performing the DAS, it is needed to pay attention to directivity that it is more difficult to observe the sound waves advancing roughly perpendicularly to the longitudinal direction of the optical fiber compared to the sound waves advancing along the longitudinal direction.

For example, Patent Literature 1 discloses a technology of sensing for the DAS, which smooths the directivity by winding the optical fiber around a core material of a predetermined winding diameter at a predetermined angle. Even though a detection method is different, a configuration of helically winding the optical fiber for sensing around a rod-like support body has been used from an early period of study of an optical fiber sensor as in Patent Literature 2 (domestic relevant literature: Japanese Unexamined Patent Application Publication No. 58-028636). Patent Literature 3 (domestic relevant literature: Japanese Patent No. 3517699) discloses the technology of detecting vibrations at a curved portion where a part of the optical fiber is curved. Patent Literature 4 discloses the technology of helically winding the optical fiber to be a distortion sensor.

CITATION LIST

Patent Literature

[Patent Literature 1] International Patent Publication No. WO2013/090544
[Patent Literature 2] U.S. Pat. No. 4,524,436
[Patent Literature 3] International Patent Publication No. WO2003/002956
[Patent Literature 4] U.S. Pat. No. 7,896,069

SUMMARY OF INVENTION

Technical Problem

The inventors have found a problem below regarding an optical fiber cable for sound wave sensing.

As disclosed in Patent Literature 1, by using an optical fiber cable for which an optical fiber is helically wound, directivity of the optical fiber cable can be smoothed. However, helical winding of the optical fiber requires special processes and machines. In addition, since the optical fiber is not at a center axis of the cable but at an outer edge portion, consideration is needed so as not to stretch and break the optical fiber when the cable is bent or the like.

The present invention is implemented in consideration of such a problem, and an object is to provide an optical fiber cable for sound wave sensing that uses a straight optical fiber and is capable of suppressing directivity.

Solution to Problem

The optical fiber cable for sound wave sensing relating to one aspect of the present invention includes a cover part that is capable of covering a straight cable core and is provided with a sound wave refraction part which refracts sound waves made incident roughly perpendicularly to a longitudinal direction of the cable core and makes the sound waves be incident diagonally to the longitudinal direction of the cable core.

Advantageous Effects of Invention

According to the present invention, an optical fiber cable for sound wave sensing that uses a straight optical fiber and is capable of suppressing directivity can be provided.

EXAMPLE EMBODIMENTS

Hereinafter, specific example embodiments to which the present invention is applied will be described in detail with reference to the drawings. However, the present invention is not limited to the example embodiments below. In addition, in order to make description clear, the description and the drawings below are appropriately simplified.

First Example Embodiment

Generally, an optical fiber cable is configured such that an optical fiber core, a tension member which supports tension and a pipe which receives a lateral pressure or the like that are bundled are covered with a cover material.

Since the present technology is applied to a cover material part as a representative example, in the description below, the description is omitted for a cable structure provided on an inner side of the cover material and the part is referred to as a "cable core" altogether.

Figure 1:
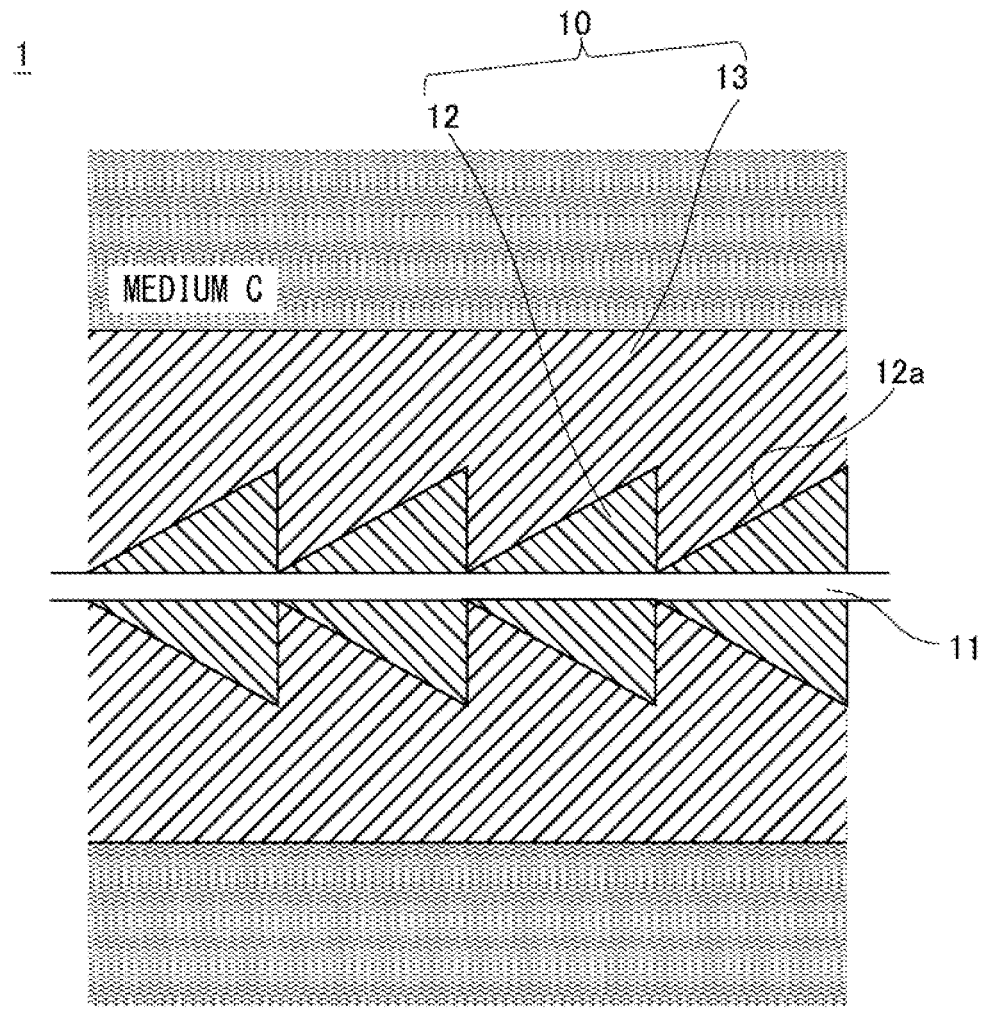
FIG. 1 is a schematic sectional view of an optical fiber cable for sound wave sensing relating to a first example embodiment.
Figure 2:
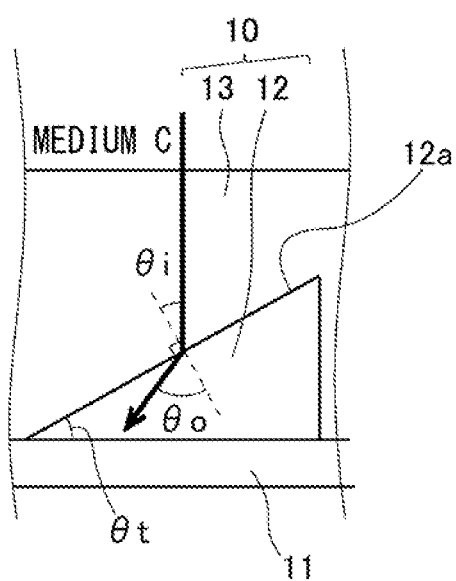
FIG. 2 is a schematic diagram illustrating refraction of sound waves in the optical fiber cable for sound wave sensing relating to the first example embodiment.
Figure 3:
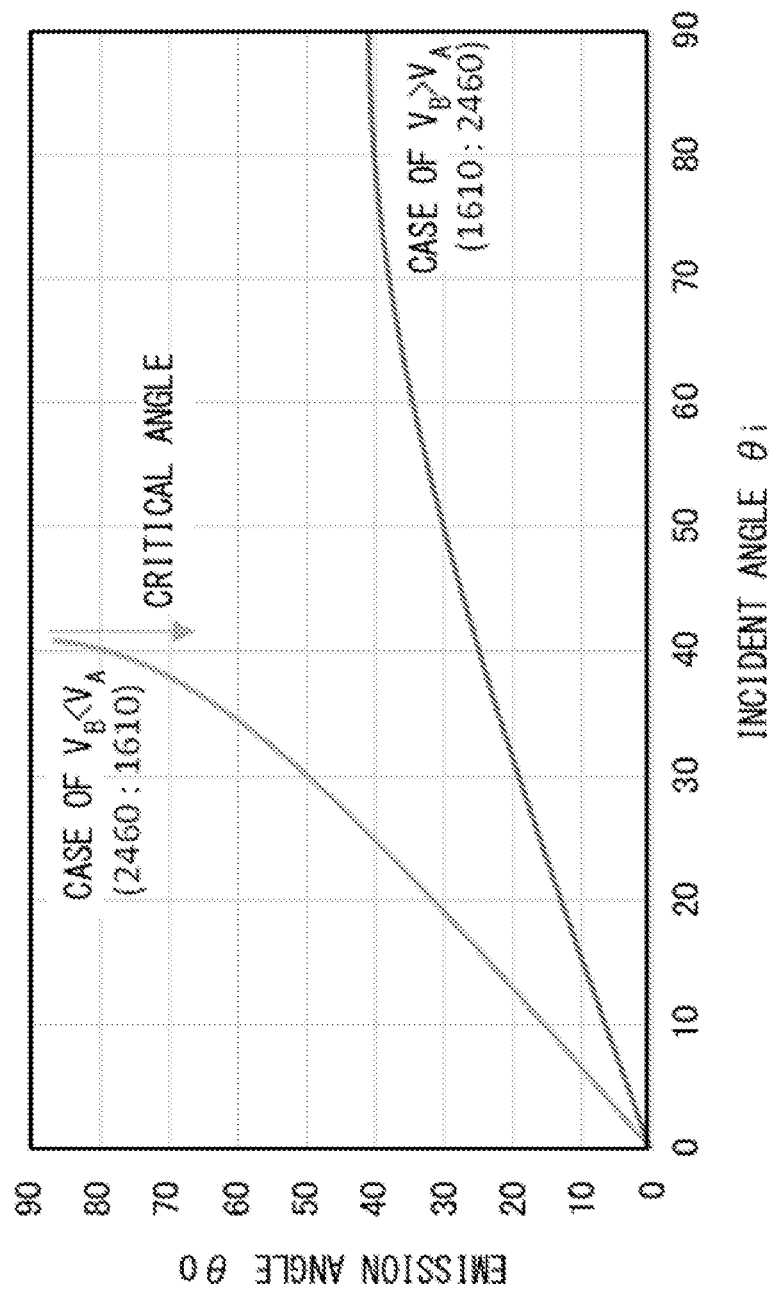
FIG. 3 is a graph illustrating a relation between an incident angle θi and an emission angle θo.

A configuration of an optical fiber cable for sound wave sensing relating to the first example embodiment of the present invention will be described with reference to FIGS. 1 to 3. FIG. 1 is a schematic sectional view of the optical fiber cable for sound wave sensing relating to the first example embodiment. FIG. 2 is a schematic diagram illustrating refraction of sound waves in the optical fiber cable for sound wave sensing relating to the first example embodiment. FIG. 3 is a graph illustrating a relation between an incident angle θi and an emission angle θo. As illustrated in FIG. 1, an optical fiber cable 1 for sound wave sensing includes a cable core 11 and a cover part 10 which covers the cable core 11. The cover part 10 includes a sound wave refraction part 12 and a gap filling part 13. On the sound wave refraction part 12, a slope 12a is formed. Note that FIG. 1 and FIG. 2 illustrate a medium C in addition to the optical fiber cable 1 for sound wave sensing.

For the cable core 11, the optical fiber core, the tension member and a lateral pressure resistant pipe or the like are bundled. For the optical fiber core, when strong tension or lateral pressure is applied, loss of light increases and there is a risk of being damaged in some cases. For that, by the tension member provided in the cable core 11, the tension applied to the optical fiber core is reduced. In addition, by the lateral pressure resistant pipe provided in the cable core 11, the lateral pressure applied to the optical fiber core is reduced.

The sound wave refraction part 12 is capable of refracting the sound waves made incident roughly perpendicularly to a longitudinal direction of the cable core 11.

The refracted sound waves advance diagonally to the longitudinal direction of the cable core 11, and are made incident on the optical fiber core in the cable core 11. When the sound waves are made incident on the optical fiber core, light passing through an incident portion is modulated. Accordingly, by monitoring reflected light and transmitted light of the optical fiber core, the sound waves around the optical fiber cable 1 for sound wave sensing can be observed.

A shape of the sound wave refraction part 12 is not limited in particular as long as it is a shape capable of refracting the sound waves that are made incident roughly perpendicularly to the longitudinal direction of the cable core 11. For example, in an example illustrated in FIG. 1, the sound waves made incident roughly perpendicularly to the longitudinal direction of the cable core 11 are refracted by providing the slope 12a on the sound wave refraction part 12. Hereinafter, in the present example embodiment, the case of providing the slope 12a on the sound wave refraction part 12 will be described.

The sound wave refraction part 12 is in such a shape that a plurality of right circular conical members are connected. Specifically, for the shape, the plurality of right circular conical members are connected so that a vertex of the right circular conical member is in contact with a center of a base of another right circular conical member. The cable core 11 penetrates a center axis of the plurality of right circular conical members. Here, each of side faces of the plurality of right circular conical members is the slope 12a.

The gap filling part 13 covers the sound wave refraction part 12. Specifically, the gap filling part 13 covers the sound wave refraction part 12 so as to fill gaps of the plurality of right circular conical members forming the sound wave refraction part 12 as illustrated in FIG. 2. By covering the sound wave refraction part 12 using the gap filling part 13, a surface of the cover part 10 can be smoothed compared to the case of not forming the gap filling part 13. When the surface of the cover part 10 is smooth, the cover part 10 does not easily get caught when stored or when moved. Thus, the optical fiber cable 1 for sound wave sensing is more easily handled.

The optical fiber cable 1 for sound wave sensing is used in a state where the slope 12a is tilted in relation to the longitudinal direction of the cable core 11. Around the optical fiber cable 1 for sound wave sensing, the medium C capable of propagating the sound waves exists. The sound wave refraction part 12 is formed using a material having a sound speed different from that of the medium C existing around the optical fiber cable 1 for sound wave sensing.

The sound wave refraction part 12 is preferably formed using the material the sound speed of which is not greatly different from that of the medium C existing around the optical fiber cable 1 for sound wave sensing and the optical fiber core. In the case where the sound speed of the medium C existing around the optical fiber cable 1 for sound wave sensing and the sound speed of the sound wave refraction part 12 are greatly different, the sound waves propagated in the medium C are easily reflected at a boundary of the medium C and the sound wave refraction part 12. In the case where the sound speed of the sound wave refraction part 12 and the sound speed of the optical fiber core are greatly different, the sound waves made incident on the sound wave refraction part 12 are easily reflected at the boundary of the sound wave refraction part 12 and the optical fiber core. Thus, when the sound wave refraction part 12 is formed using the material the sound speed of which is not greatly different from that of the medium C existing around the optical fiber cable 1 for sound wave sensing and the optical fiber core, reflection of the light at each boundary can be suppressed.

The medium C existing around the optical fiber cable 1 for sound wave sensing is, for example, air, water or soil. The optical fiber core in the cable core 11 is formed using quartz glass, for example. Typical sound speeds of air, water, soil and quartz glass are indicated in Table 1 below. As illustrated in Table 1, the optical fiber core is formed using the material the sound speed of which is higher than that of the medium C existing around the optical fiber cable 1 for sound wave sensing.

TABLE 1

| Material | Sound speed (m/s) |
| --- | --- |
| Air | 340 |
| Water | 1500 |
| Soil | 1550 |
| Quartz glass | 5750 |

It is preferable that the cover part 10 is formed using a resin-like material. The resin-like material is one or more kinds selected from Teflon®, natural rubber, butadiene rubber, low density polyethylene (JDPE), polyvinyl chloride (PVC), polystyrene, high density polyethylene (HDPE), nylon, polyimide and acryl, for example. The typical sound speeds of the resin-like material are indicated in Table 2.

TABLE 2

| Material | Sound speed (m/s) |
| --- | --- |
| Teflon | 1400 |
| Natural rubber | 1500-1600 |
| Butadiene rubber | 1610 |
| Low density polyethylene (LDPE) | 2080 |
| Polyvinyl chloride (PVC) | 2350 |
| Polystyrene | 2350 |
| High density polyethylene (HDPE) | 2460 |
| Nylon | 2690 |
| Polyimide | 2600 |
| Acryl | 2750 |

The sound wave refraction part 12 is preferably formed using the material that satisfies an expression (1) below. When the sound wave refraction part 12 is formed using the material that satisfies the expression (1) below, the sound speed of the sound wave refraction part 12 does not become greatly different from the sound speed of the medium C and the sound speed of the optical fiber core. In the expression (1) below, $V_f$, $V_A$ and $V_C$ are the sound speed of the cable core 11, the sound speed of the sound wave refraction part 12 and the sound speed of the medium, respectively. In the case where the medium C is water and the optical fiber core is made of quartz glass, the material that satisfies the expression (1) below is high density polyethylene for example. The sound speed of the high density polyethylene is 2460 m/s.

[Math. 1]

$$V_C < V_A < V_f \quad \text{Expression (1)}$$

The sound waves propagated perpendicularly to the longitudinal direction of the cable core 11 in the medium C are made incident diagonally to the slope 12a. Therefore, the sound wave refraction part 12 can refract the sound waves advancing perpendicularly to the longitudinal direction of the cable core 11 in the medium C. The refracted sound waves include more components parallel with the longitudinal direction of the cable core 11 compared to that before refraction. Accordingly, the light passing through the optical fiber core in the cable core 11 is modulated by the refracted sound waves. In such a manner, the optical fiber cable 1 for sound wave sensing can detect the sound waves propagated in the medium C roughly perpendicularly to the longitudinal direction of the cable core 11.

Note that, in the example illustrated in FIG. 1, the case of forming the sound wave refraction part 12 using the plurality of right circular conical members of the same shape has been described. However, the shape and arrangement of the plurality of right circular conical members may vary. In addition, the plurality of right circular conical members forming the sound wave refraction part 12 may be distorted or the like on the slope 12a. The plurality of right circular conical members forming the sound wave refraction part 12 may be slightly rounded at corners. The sound wave refraction part 12 and the gap filling part 13 may be slightly mixed together and formed. In the case where the sound wave refraction part 12 and the gap filling part 13 are mixed together, the cover part 10 acts like a distribution lens and refracts the sound waves. In this way, high accuracy is not demanded when manufacturing the cover part 10. Accordingly, the optical fiber cable 1 for sound wave sensing is easy to manufacture.

In the first example embodiment, the gap filling part 13 is formed using a material the sound speed of which is lower compared to that of the sound wave refraction part 12. The sound wave refraction part 12 and the gap filling part 13 are preferably formed using such materials that the sound speed becomes higher in order of the medium C, the gap filling part 13, the sound wave refraction part 12 and the optical fiber core. The sound waves are propagated in order of the medium C, the gap filling part 13, the sound wave refraction part 12 and the cable core 11. Therefore, when the sound speed becomes higher in order of the medium C, the gap filling part 13, the sound wave refraction part 12 and the optical fiber core, the reflection at the individual boundaries is suppressed.

The cover part 10 does not need to refract the sound waves propagated in the medium C at the boundary of the medium C and the gap filling part 13. Thus, the gap filling part 13 is preferably formed using the material having the sound speed close to that of the medium C existing around the optical fiber cable 1 for sound wave sensing. That is, the gap filling part 13 is preferably formed using the material that satisfies an expression (2) below. In the expression (2) below, $V_B$ is the sound speed of the gap filling part 13. In the case where the medium C is water, the optical fiber core is made of quartz glass and the sound wave refraction part 12 is made of high density polyethylene, the material that satisfies the expression (2) below is butadiene rubber for example. The sound speed of the butadiene rubber is 1610 m/s. When the gap filling part 13 is formed using the material having the sound speed closer to that of the medium C, the reflection of the sound waves at the boundary of the medium C and the gap filling part 13 can be suppressed.

[Math. 2]

$$V_C \approx V_B < V_A < V_f \quad \text{Expression (2)}$$

FIG. 2 is a schematic diagram illustrating the refraction of the sound waves in the optical fiber cable for sound wave sensing relating to the first example embodiment. An arrow illustrated in FIG. 2 indicates an advancing direction of the sound waves. The incident angle θi is an angle formed by a normal line of the slope 12a and the advancing direction of the sound waves in the gap filling part 13. The emission angle θo is an angle formed by the normal line of the slope 12a and the advancing direction of the sound waves in the sound wave refraction part 12. A tilt angle θt is an angle formed by the slope 12a and the cable core 11.

In the first example embodiment, the gap filling part 13 is formed using the material the sound speed of which is lower compared to that of the sound wave refraction part 12. Therefore, in the cover part 10, the emission angle θo is always larger than the incident angle θi by Snell's law. Accordingly, in the case where the incident angle θi is a predetermined angle or larger, total reflection occurs. A lower limit of the incident angle θi causing the total reflection is defined as a critical angle θc. The critical angle θc can be calculated as illustrated in an expression (3) below. The sound wave refraction part 12 is designed such that the tilt angle θt becomes smaller than the critical angle θc. In the case where the tilt angle θt is smaller than the critical angle θc, the sound waves made incident roughly perpendicularly to the longitudinal direction of the cable core 11 can be refracted on a boundary surface of the gap filling part 13 and the sound wave refraction part 12.

[Math. 3]

$$\theta_C = \arcsin\frac{V_B}{V_A} \qquad \text{Expression (3)}$$

The sound wave refraction part 12 is preferably designed such that the tilt angle θt becomes smaller than the critical angle θc by 15° or more. In the sound waves for which the angle formed with the longitudinal direction of the cable core 11 is 75° or larger, there are not many components parallel with the longitudinal direction of the cable core 11. When the sound wave refraction part 12 is designed such that the tilt angle θt becomes smaller than the critical angle θc by 15° or more, the sound waves for which the angle formed with the longitudinal direction of the cable core 11 is 75° or larger can be refracted in the sound wave refraction part 12. The sound waves refracted in the sound wave refraction part 12 easily modulate the light passing through the optical fiber core since the components parallel with the longitudinal direction of the cable core 11 increase. Accordingly, when using the optical fiber cable 1 for sound wave sensing including the sound wave refraction part 12 for which the tilt angle θt is smaller than the critical angle θc by 15° or more, the sound waves for which the angle formed with the longitudinal direction of the cable core 11 is 75° or larger can be monitored.

FIG. 3 illustrates a relation between the incident angle θi and the emission angle θo in the case where the sound wave refraction part 12 is made of high density polyethylene and the gap filling part 13 is made of butadiene rubber. When the sound wave refraction part 12 is made of high density polyethylene and the gap filling part 13 is made of butadiene rubber, as illustrated in FIG. 3, the critical angle θc is about 41°. Thus, the sound wave refraction part 12 is designed such that the tilt angle θt becomes 41° or smaller, preferably 26° or smaller.

In the first example embodiment, the case where the cover part 10 includes the gap filling part 13 has been described. However, the cover part 10 may not include the gap filling part 13. In the case where the cover part 10 does not include the gap filling part 13, the medium C enters the part corresponding to the gap filling part 13. In the case where the cover part 10 does not include the gap filling part 13, the sound wave refraction part 12 is formed using the material having the sound speed different from that of the medium C existing around the optical fiber cable 1 for sound wave sensing.

Second Example Embodiment

Figure 4:
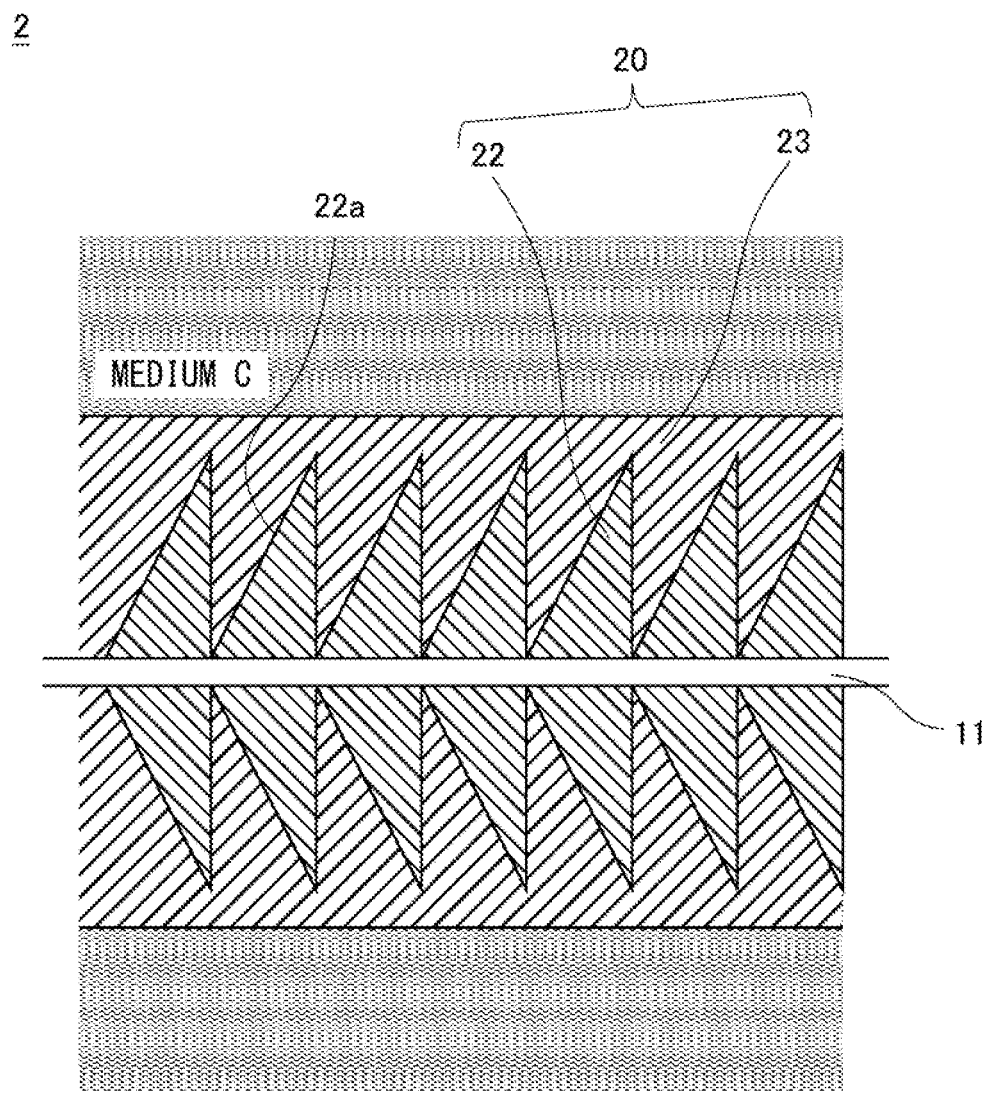
FIG. 4 is a schematic sectional view of the optical fiber cable for sound wave sensing relating to a second example embodiment.
Figure 5:
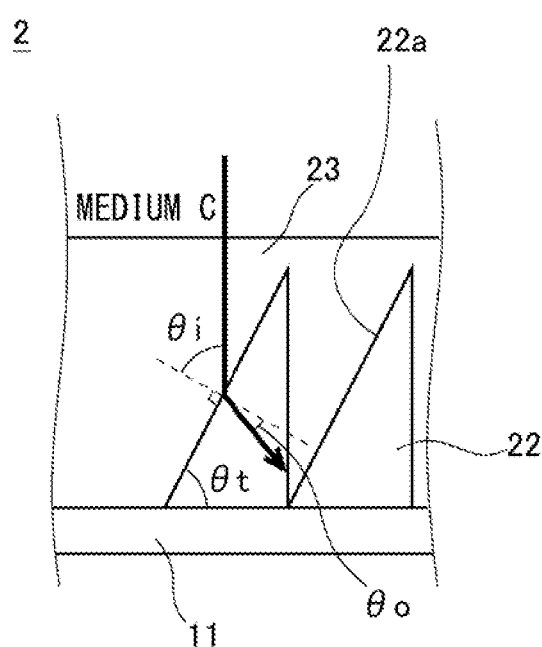
FIG. 5 is a schematic diagram illustrating the refraction of the sound waves in the optical fiber cable for sound wave sensing relating to the second example embodiment.
Figure 6:
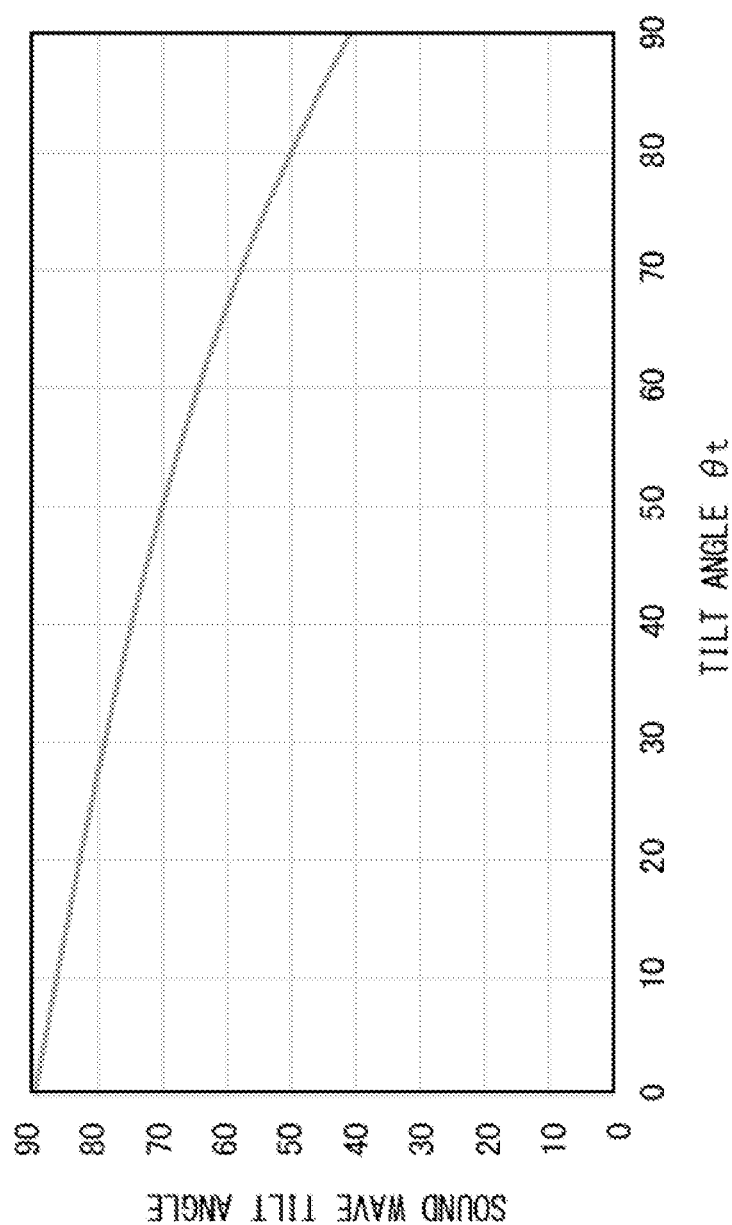
FIG. 6 is a graph illustrating a relation between a tilt angle θt and a cable incident angle.

Next, with reference to FIGS. 3 to 6, the configuration of the optical fiber cable for sound wave sensing relating to the second example embodiment will be described. FIG. 4 is a schematic sectional view of the optical fiber cable for sound wave sensing relating to the second example embodiment. FIG. 5 is a schematic diagram illustrating the refraction of the sound waves in the optical fiber cable for sound wave sensing relating to the second example embodiment. FIG. 6 is a graph illustrating a relation between the tilt angle θt and a cable incident angle. As illustrated in FIG. 4, an optical fiber cable 2 for sound wave sensing includes a cover part 20 instead of the cover part 10 illustrated in FIG. 1. The cover part 20 includes a sound wave refraction part 22 and a gap filling part 23. Since the other configuration is the same as the configuration described in the first example embodiment, redundant description is appropriately omitted. Note that FIG. 4 and FIG. 5 illustrate the medium C in addition to the optical fiber cable 2 for sound wave sensing.

The sound wave refraction part 22 is in such a shape that the plurality of right circular conical members are connected, similarly to the sound wave refraction part 12 illustrated in FIG. 1. Each of the side faces of the plurality of right circular conical members is a slope 22a. The cable core 11 penetrates the center axis of the plurality of right circular conical members. The gap filling part 23 covers the sound wave refraction part 22 similarly to the gap filling part 13 illustrated in FIG. 1.

In the second example embodiment, the gap filling part 23 is formed using the material the sound speed of which is higher compared to that of the sound wave refraction part 22. That is, the sound wave refraction part 22 and the gap filling part 23 are formed using the material that satisfies an expression (4) below. In the case where the medium C is water and the optical fiber core is made of quartz glass, by making the sound wave refraction part 22 of butadiene rubber and making the gap filling part 23 of high density polyethylene for example, the expression (4) below can be satisfied.

[Math. 4]

$$V_A < V_B \qquad \text{Expression (4)}$$

FIG. 5 is the schematic diagram illustrating the refraction of the sound waves in the optical fiber cable for sound wave sensing relating to the second example embodiment. An arrow illustrated in FIG. 5 indicates the advancing direction of the sound waves. In the second example embodiment, the gap filling part 23 is formed using the material the sound speed of which is higher than that of the sound wave refraction part 22. Therefore, in the cover part 20, the emission angle θo is always smaller than the incident angle θi by the Snell's law as illustrated in FIG. 5. Accordingly, at the boundary of the gap filling part 23 and the sound wave refraction part 22, the total reflection does not occur. Thus, the sound wave refraction part 22 can refract the sound waves made incident at an angle roughly parallel with the tilt angle θt. In addition, the advancing direction of the sound waves refracted in the sound wave refraction part 22 is converged to be roughly parallel with the normal line of the slope 22a when the incident angle θi becomes large.

FIG. 3 illustrates the relation between the incident angle θi and the emission angle θo in the case where the sound wave refraction part 22 is made of butadiene rubber and the gap filling part 23 is made of high density polyethylene. When the sound wave refraction part 22 is made of butadiene rubber and the gap filling part 23 is made of high density polyethylene, in the case where the incident angle θi is 45° or larger, the emission angle θo is converged to be 28° or larger and 41° or smaller.

The angle formed by the advancing direction in the sound wave refraction part 22 of the sound waves made incident roughly perpendicularly to the longitudinal direction of the cable core 11 and the longitudinal direction of the cable core 11 is defined as a sound wave tilt angle θf. The sound wave tilt angle θf can be calculated as illustrated in an expression (5) below. In the case where the sound wave tilt angle θf is small, in the sound waves made incident roughly perpendicularly to the longitudinal direction of the cable core 11, when refracted in the sound wave refraction part 22, the components parallel with the longitudinal direction of the cable core 11 increase.

[Math. 5]

$$\theta_f = 90° - \theta_t + \theta_o \quad \text{Expression (5)}$$

As illustrated in the expression (5) above, when the tilt angle θt is made large, the sound wave tilt angle θf becomes small. Thus, it is preferable that the sound wave refraction part 22 is designed such that the tilt angle θt becomes large. FIG. 6 illustrates the relation between the tilt angle θt and the sound wave tilt angle θf in the case where the sound wave refraction part 22 is made of butadiene rubber and the gap filling part 23 is made of high density polyethylene. As illustrated in FIG. 6, by designing the sound wave refraction part 22 so that the tilt angle θt becomes 67° or larger, the sound wave tilt angle θf can be turned to 60° or smaller.

Third Example Embodiment

Figure 7:
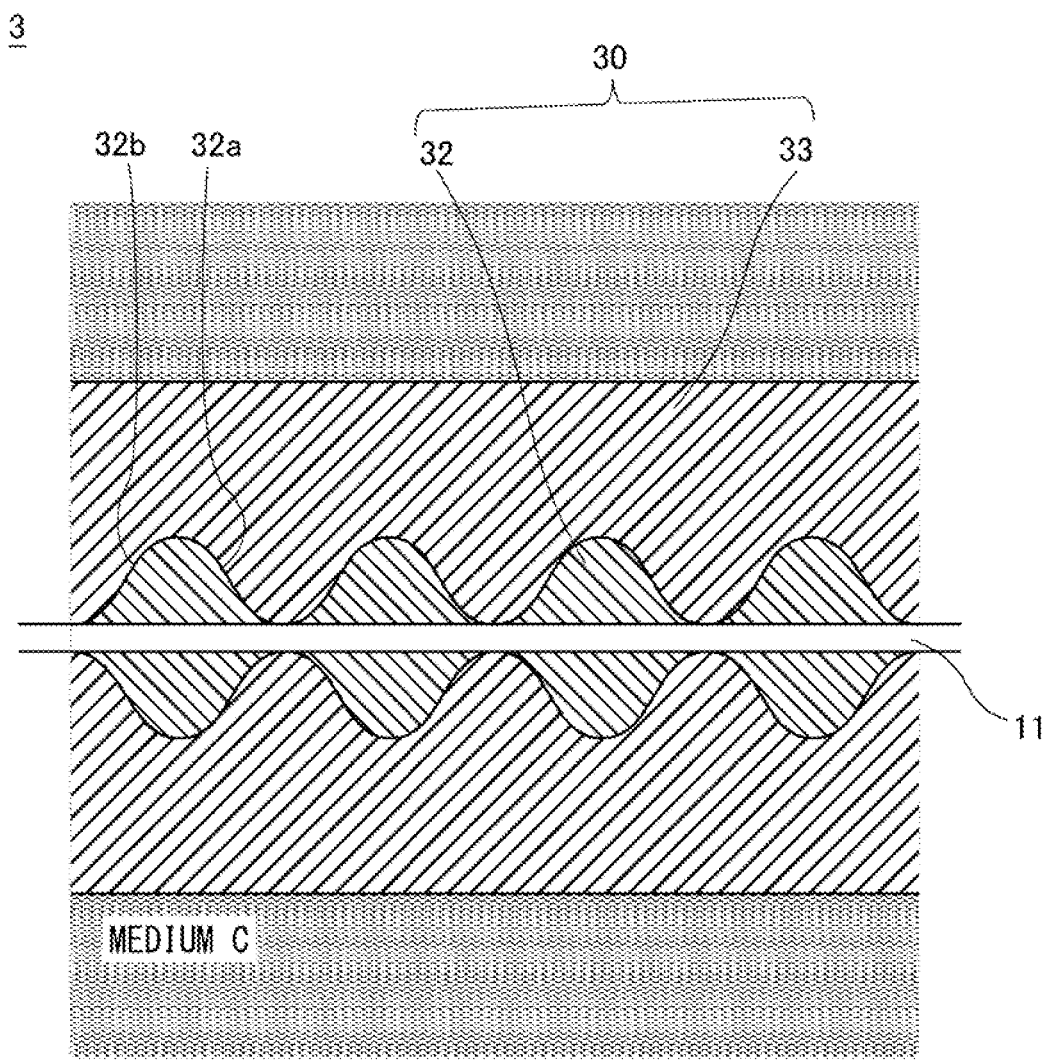
FIG. 7 is a schematic sectional view of the optical fiber cable for sound wave sensing relating to a third example embodiment.

Next, with reference to FIG. 7, the configuration of the optical fiber cable for sound wave sensing relating to the third example embodiment will be described. FIG. 7 is a schematic sectional view of the optical fiber cable for sound wave sensing relating to the third example embodiment. As illustrated in FIG. 7, an optical fiber cable 3 for sound wave sensing includes a cover part 30 instead of the cover part 10 illustrated in FIG. 1. The cover part 30 includes a sound wave refraction part 32 and a gap filling part 33. Since the other configuration is the same as the configuration described in the first and second example embodiments, the redundant description is appropriately omitted. Note that FIG. 7 illustrates the medium C in addition to the optical fiber cable 3 for sound wave sensing.

The sound wave refraction part 32 is a member in a shape like a corrugated pipe. For the sound wave refraction part 32, specifically, recesses and projections are repeatedly formed on an outer side face. Therefore, when the sound wave refraction part 32 is cut in the longitudinal direction, the outer side face becomes corrugated. The cable core 11 penetrates the center axis of the sound wave refraction part 32. The projections formed on the outer side face of the sound wave refraction part 32 include a pair of slopes, respectively. The pair of slopes that the projections include are slopes 32a and 32b. The gap filling part 33 covers the sound wave refraction part 32 similarly to the gap filling part 13 illustrated in FIG. 1.

In the third example embodiment, the gap filling part 33 is formed using the material the sound speed of which is lower compared to that of the sound wave refraction part 32. Accordingly, the sound wave refraction part 32 is designed such that the tilt angle on the slope 32a and the tilt angle on the slope 32b are smaller than the critical angle θc, similarly to the sound wave refraction part 12 illustrated in FIG. 1. The sound wave refraction part 32 does not include corner portions, as illustrated in FIG. 7. Generally, in the case of forming the corner portions on a member, it is needed to perform manufacture with high accuracy compared to the case of not forming the corner portions on the member. Therefore, the sound wave refraction part 32 is further easier to manufacture compared to the sound wave refraction part 12 illustrated in FIG. 1.

It is preferable that the sound wave refraction part 32 is formed such that the tilt angle of the slope 32a and the tilt angle of the slope 32b are different. In the case where the tilt angles of the slopes 32a and 32b are different, when the sound waves are made incident perpendicularly to the longitudinal direction of the cable core 11, the sound wave tilt angle θf of the sound waves refracted on the slope 32a and the sound wave tilt angle θf of the sound waves refracted on the slope 32b become different. Accordingly, the sound waves refracted on the slope 32a and the sound waves refracted on the slope 32b are propagated to the cable core 11 without completely cancelling each other.

In the third example embodiment, the case where the cover part 30 includes the gap filling part 33 has been described. However, the cover part 30 may not include the gap filling part 33. In the case where the cover part 30 does not include the gap filling part 33, the medium C enters the part corresponding to the gap filling part 13. In the case where the cover part 30 does not include the gap filling part 33, the sound wave refraction part 32 is formed using the material having the sound speed different from that of the medium C existing around the optical fiber cable 3 for sound wave sensing, similarly to the sound wave refraction part 12 illustrated in FIG. 1.

Fourth Example Embodiment

Figure 8:
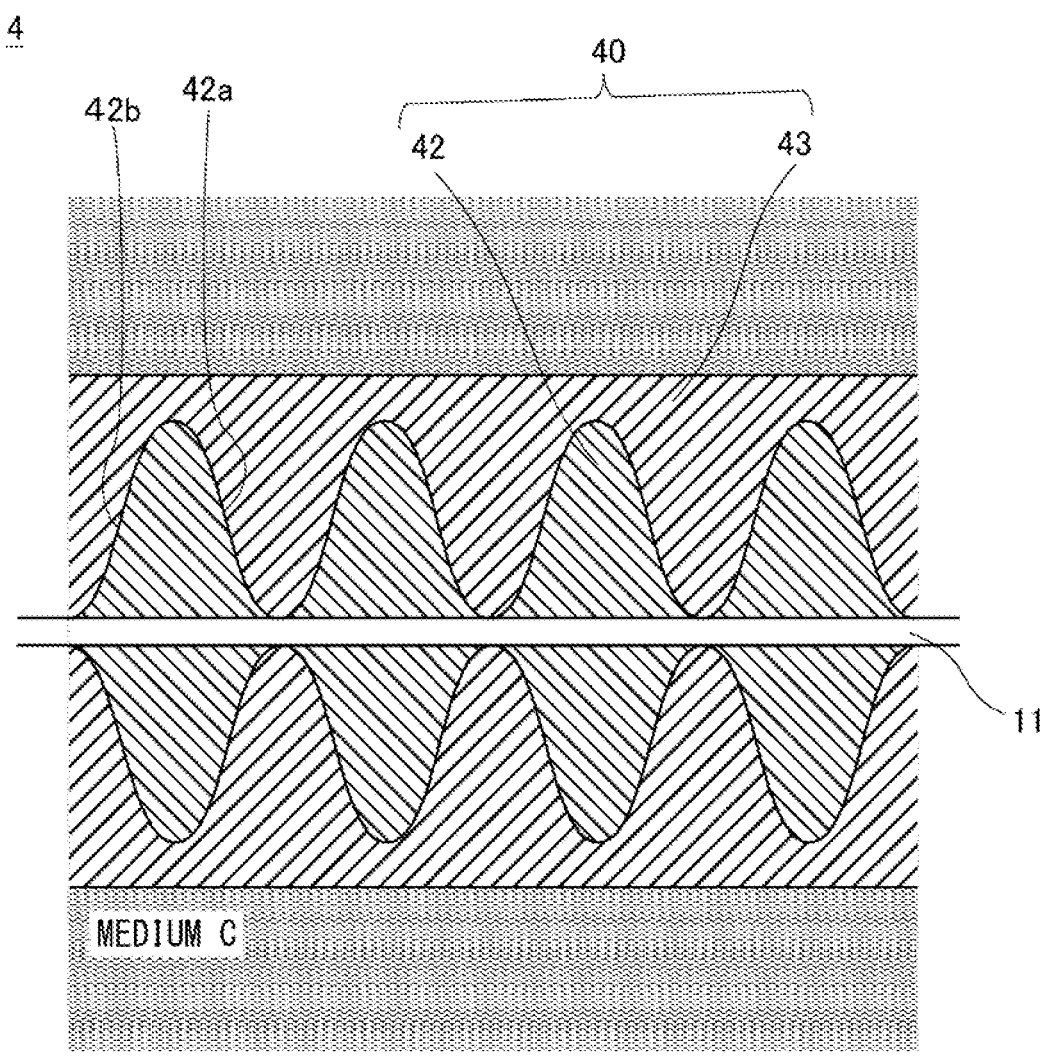
FIG. 8 is a schematic sectional view of the optical fiber cable for sound wave sensing relating to a fourth example embodiment.

Next, with reference to FIG. 8, the configuration of the optical fiber cable for sound wave sensing relating to the fourth example embodiment will be described. FIG. 8 is a schematic sectional view of the optical fiber cable for sound wave sensing relating to the fourth example embodiment. As illustrated in FIG. 8, an optical fiber cable 4 for sound wave sensing includes a cover part 40 instead of the cover part 30 illustrated in FIG. 7. The cover part 40 includes a sound wave refraction part 42 and a gap filling part 43. Since the other configuration is the same as the configuration described in the first-third example embodiments, the redundant description is appropriately omitted. Note that FIG. 8 illustrates the medium C in addition to the optical fiber cable 4 for sound wave sensing.

The sound wave refraction part 42 is a member in the shape like a corrugated pipe, similarly to the sound wave refraction part 32 illustrated in FIG. 8. The gap filling part 43 covers the sound wave refraction part 42 similarly to the gap filling part 33 illustrated in FIG. 8. In the fourth example embodiment, the gap filling part 43 is formed using the material the sound speed of which is higher compared to that of the sound wave refraction part 42. Therefore, it is preferable that the sound wave refraction part 42 is designed such that the tilt angle θt becomes large, similarly to the sound wave refraction part 22 illustrated in FIG. 4.

Fifth Example Embodiment

Figure 9:
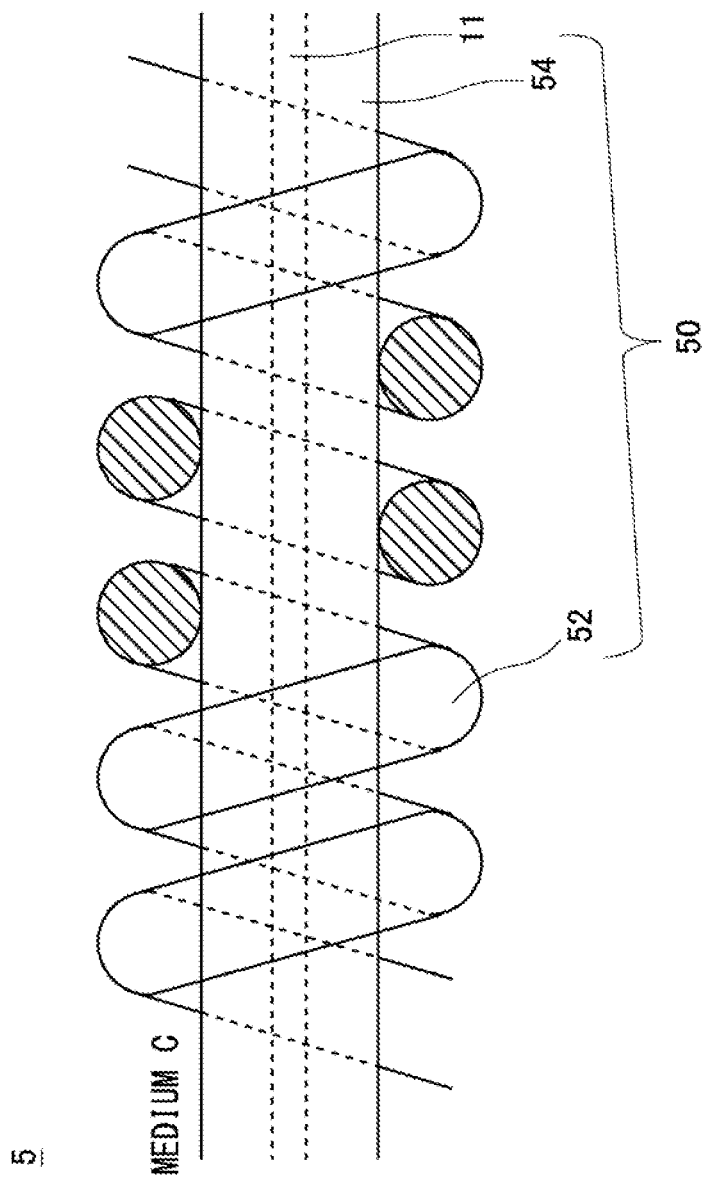
FIG. 9 is a schematic diagram of the optical fiber cable for sound wave sensing relating to a fifth example embodiment.
Figure 10:
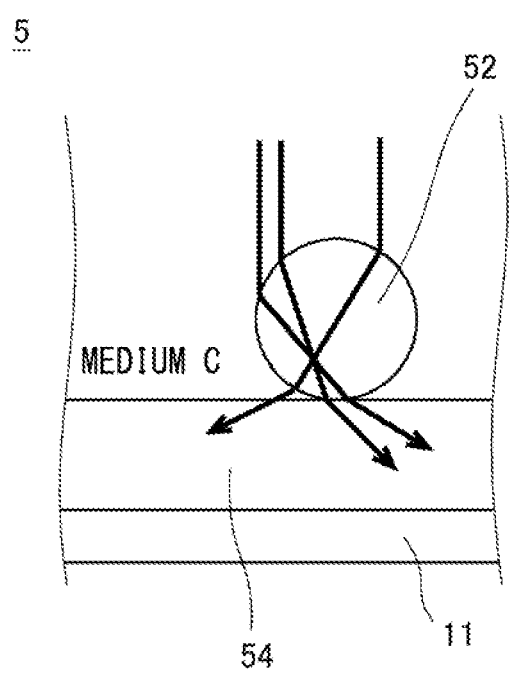
FIG. 10 is a schematic diagram illustrating the refraction of the sound waves in the optical fiber cable for sound wave sensing relating to the fifth example embodiment.

Next, with reference to FIG. 9 and FIG. 10, the configuration of the optical fiber cable for sound wave sensing relating to the fifth example embodiment will be described. FIG. 9 is a schematic diagram of the optical fiber cable for sound wave sensing relating to the fifth example embodiment. FIG. 10 is a schematic diagram illustrating the refraction of the sound waves in the optical fiber cable for sound wave sensing relating to the fifth example embodiment. FIG. 9 is the schematic diagram in which a part of an optical fiber cable 5 for sound wave sensing is cut off. As illustrated in FIG. 9, the optical fiber cable 5 for sound wave sensing includes a cover part 50 instead of the cover part 10 in FIG. 1.

The cover part 50 includes a sound wave refraction part 52 instead of the sound wave refraction part 12 illustrated in FIG. 1. The cover part 50 may include a reinforcement part 54 in addition to the sound wave refraction part 52. Since the other configuration is the same as the configuration described in the first-fourth example embodiments, the redundant description is appropriately omitted. Note that FIG. 9 and FIG. 10 illustrate the medium C in addition to the optical fiber cable 5 for sound wave sensing.

The sound wave refraction part 52 is a string-like member. The sound wave refraction part 52 is arranged so as to be wound around the cable core 11. In an example illustrated in FIG. 9, the sound wave refraction part 52 is helically wound around the cable core 11. The sound wave refraction part 52 may be the string-like member which is rounded and made into a ring shape. In the case where the sound wave refraction part 52 is the ring shape, by inserting the cable core 11 to a plurality of ring-like members, the sound wave refraction part 52 is arranged so as to be wound around the cable core 11.

The sound wave refraction part 52 illustrated in FIG. 9 is the string-like member which is circular on a transverse section. Therefore, as illustrated in FIG. 10, the boundary surface of the sound wave refraction part 52 with the medium C is a curved surface so that the sound waves propagated perpendicularly to the longitudinal direction of the cable core 11 are refracted on the boundary surface of the medium C and the sound wave refraction part 52 as illustrated in FIG. 10.

In the example illustrated in FIG. 9 and FIG. 10, the case where the sound wave refraction part 52 is the string-like member which is circular on the transverse section has been described. However, the sound wave refraction part 52 may be the string-like member of any shape as long as it is the string-like member for which the boundary surface with the medium C is a curved surface or a slope. The sound wave refraction part 52 may be the string-like member which is semicircular, trapezoidal, triangular or the like on the transverse section, for example.

In the example illustrated in FIG. 9, the cover part 50 includes the reinforcement part 54. The reinforcement part 54 is a tubular member with a through-hole formed at the center. The cable core 11 is inserted to the through-hole formed in the reinforcement part 54. In the case where the cover part 50 includes the reinforcement part 54, the sound wave refraction part 52 is wound around the reinforcement part 54 as illustrated in FIG. 9. In the case where the cover part 50 includes the reinforcement part 54, a bend radius of the sound wave refraction part 52 when winding the sound wave refraction part 52 can be increased compared to the case where the cover part 50 does not include the reinforcement part 54.

In the case where the bend radius of the sound wave refraction part 52 is large, tensile force that a bent outer side of the sound wave refraction part 52 receives is small compared to the case where the bend radius is small. Therefore, by increasing the bend radius of the sound wave refraction part 42, damages of the sound wave refraction part 52 can be suppressed. Thus, in the case where the cover part 50 includes the reinforcement part 54, the damages of the sound wave refraction part 52 can be suppressed even in the case where a cross-sectional area of the cable core 11 is small.

The sound wave refraction part 52 is formed using the material having the sound speed different from that of the medium C existing around the optical fiber cable 5 for sound wave sensing. It is preferable that the sound wave refraction part 52 is formed using the material the sound speed of which is not greatly different from that of the medium C existing around the optical fiber cable 5 for sound wave sensing and the optical fiber core in the cable core 11. Therefore, the sound wave refraction part 12 is preferably formed using the material that satisfies an expression (1) below.

[Math. 6]

$$V_C < V_A < V_f \qquad \text{Expression (1)}$$

In the case where the cover part 50 includes the reinforcement part 54, it is preferable that the material forming the reinforcement part 54 satisfies an expression (6) below. When the reinforcement part 54 is formed using the material that satisfies the expression (6) below, the reflection of the sound waves is suppressed at the boundary of the sound wave refraction part 52 and the reinforcement part 54 and the boundary of the reinforcement part 54 and the cable core 11. In the expression (6) below, $V_D$ indicates the sound speed of the reinforcement part 54.

[Math. 7]

$$V_B < V_D < V_f \qquad \text{Expression (6)}$$

The cover part 50 may include a non-illustrated gap filling part. The non-illustrated gap filling part covers the sound wave refraction part 52. When covered with the gap filling part, the sound wave refraction part 52 is fixed at a wound position. In addition, in the case where the cover part 50 includes the gap filling part, recesses and projections on a surface of the cover part 50 can be suppressed. Thus, the optical fiber cable 5 for sound wave sensing for which the cover part 50 includes the gap filling part is easy to handle compared to the case where the cover part 50 does not include the gap filling part.

Sixth Example Embodiment

Figure 11:
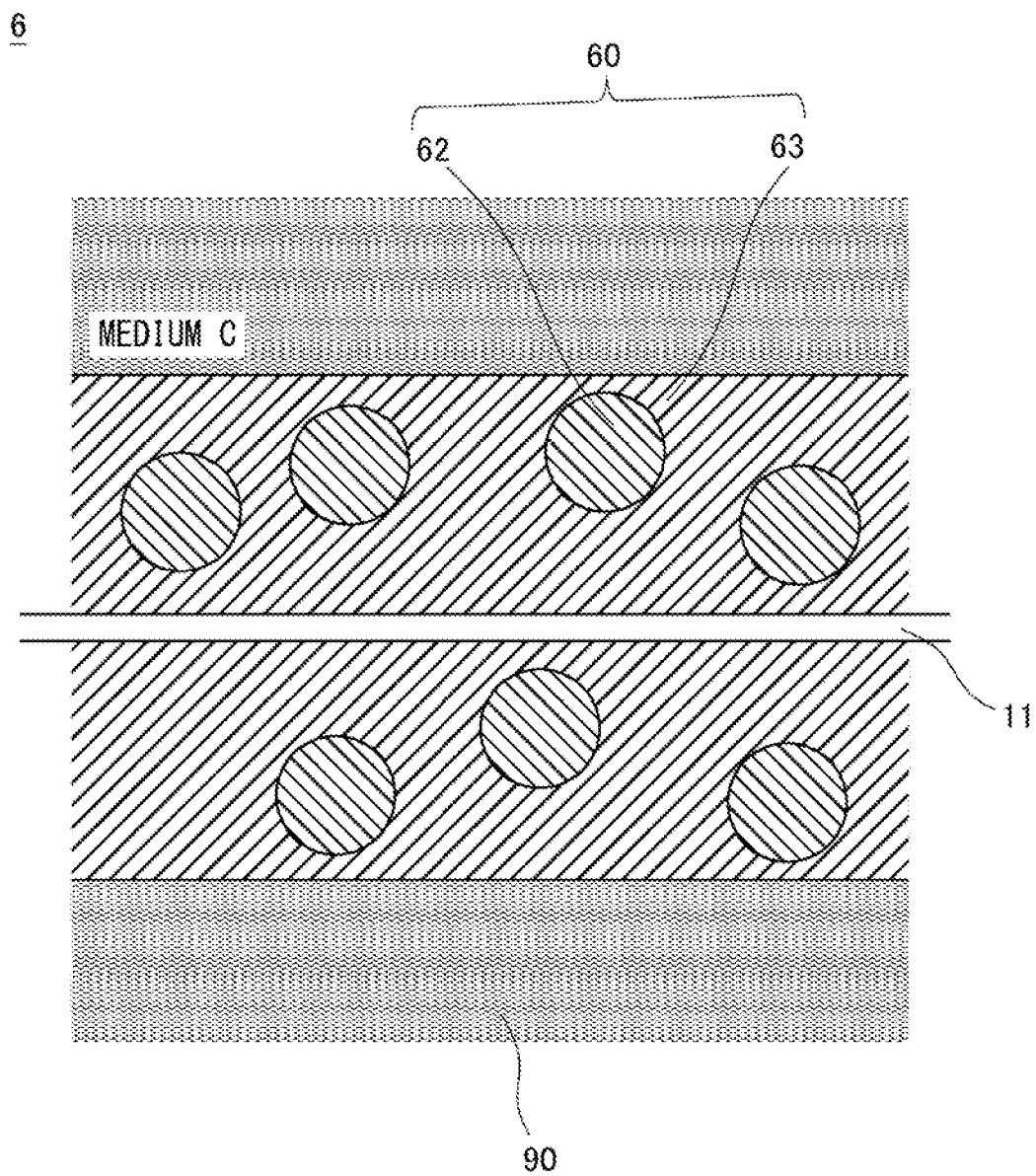
FIG. 11 is a schematic sectional view of the optical fiber cable for sound wave sensing relating to a sixth example embodiment.
Figure 12:
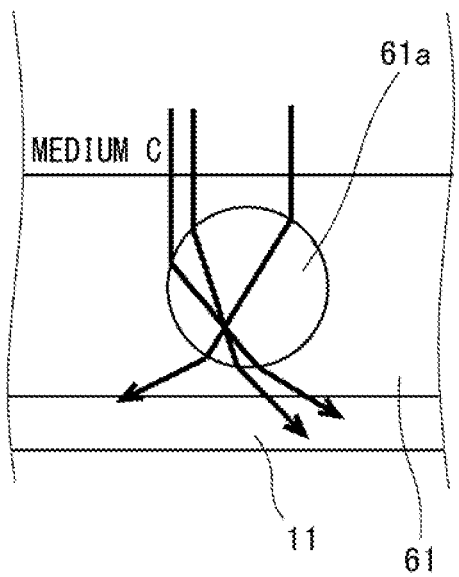
FIG. 12 is a schematic diagram illustrating the refraction of the sound waves in the optical fiber cable for sound wave sensing relating to the sixth example embodiment.

Next, with reference to FIG. 11 and FIG. 12, the configuration of the optical fiber cable for sound wave sensing relating to the sixth example embodiment will be described. FIG. 11 is a schematic sectional view of the optical fiber cable for sound wave sensing relating to the sixth example embodiment. FIG. 12 is a schematic diagram illustrating the refraction of the sound waves in the optical fiber cable for sound wave sensing relating to the sixth example embodiment. As illustrated in FIG. 11, an optical fiber cable 6 for sound wave sensing includes a cover part 60 instead of the cover part 10 in FIG. 2. The cover part 60 includes a sound wave refraction part 62 and a gap filling part 63. Since the other configuration is the same as the configuration described in the first-fifth example embodiments, the redundant description is appropriately omitted. Note that FIG. 11 and FIG. 12 illustrate the medium C in addition to the optical fiber cable 6 for sound wave sensing.

The sound wave refraction part 62 is a plurality of pellet-like members. The shape of the plurality of pellet-like members is not limited in particular. The shape of the plurality of pellet-like members is, for example, roughly spherical. The shape of the plurality of pellet-like members may be ellipsoidal, indeterminate or the like. A size of the plurality of pellet-like members may be the same or may vary. As illustrated in FIG. 11, the sound wave refraction part 62 is scattered in the gap filling part 63. In an example illustrated in FIG. 11, the sound wave refraction part 62 is scattered with such a density that pellets are not brought into contact with each other in the gap filling part 63. However, as long as a gap that the gap filling part 63 can enter exists between the pellets, the sound wave refraction part 62 may be scattered with such a density that the pellets are brought into contact with each other in the gap filling part 63.

The sound wave refraction part 62 is formed using the material having the sound speed different from that of the medium C existing around the optical fiber cable 6 for sound wave sensing. It is preferable that the sound wave refraction part 62 is formed using the material the sound speed of which is not greatly different from that of the medium C existing around the optical fiber cable 6 for sound wave sensing and the optical fiber core. In addition, it is preferable that the gap filling part 63 is formed using the material having the sound speed close to that of medium C existing around the optical fiber cable 6 for sound wave sensing. That is, it is preferable that the sound wave refraction part 62 and the gap filling part 63 are formed using the material that satisfies an expression (2) below.

[Math. 8]

$$V_C \cong V_B < V_A < V_f \quad \text{Expression (2)}$$

Seventh Example Embodiment

Figure 13:
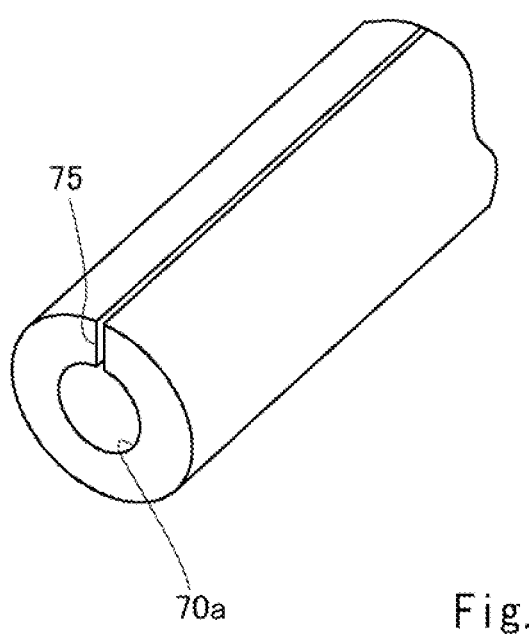
FIG. 13 is a perspective view of a cover part provided in the optical fiber cable for sound wave sensing relating to a seventh example embodiment.
Figure 14:
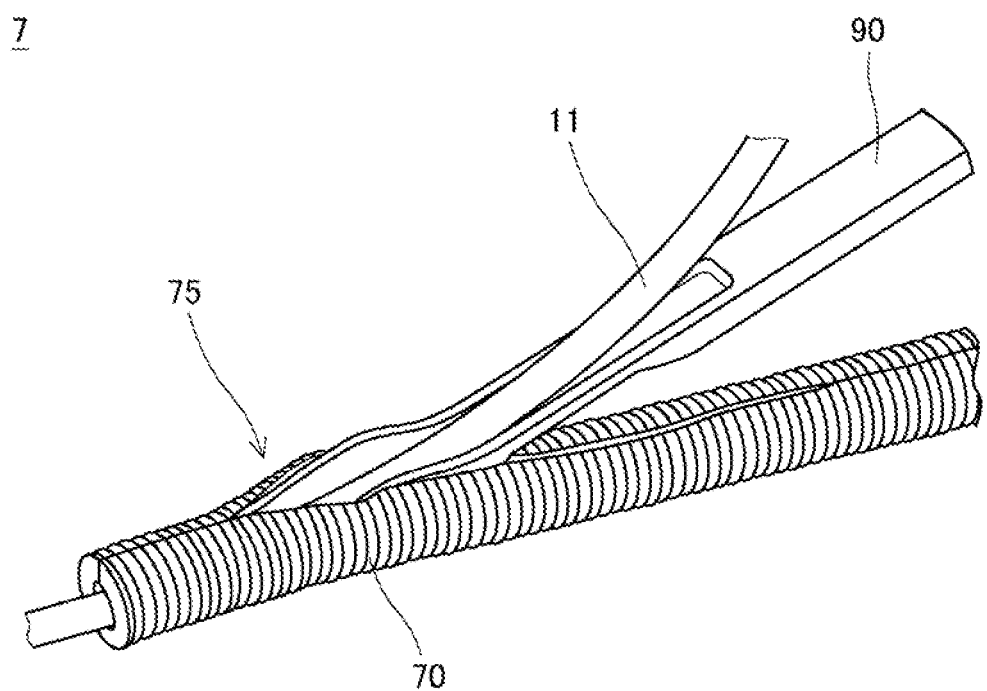
FIG. 14 is a schematic diagram of cover part attaching work for the optical fiber cable for sound wave sensing relating to the seventh example embodiment.

Next, with reference to FIG. 13 and FIG. 14, the configuration of the optical fiber cable for sound wave sensing relating to the seventh example embodiment will be described. FIG. 13 is a perspective view of the cover part provided in the optical fiber cable for sound wave sensing relating to the seventh example embodiment. FIG. 14 is a schematic diagram of cover part attaching work for the optical fiber cable for sound wave sensing relating to the seventh example embodiment. As illustrated in FIG. 13, an optical fiber cable 7 for sound wave sensing includes a cover part 70 instead of the cover part 10 in FIG. 1. In the cover part 70, a cable core attaching hole 70a and a slit 75 are formed. FIG. 14 illustrates a jig 90 in addition to the optical fiber cable 7 for sound wave sensing. Since the other configuration is the same as the configuration described in the first-sixth example embodiments, the redundant description is appropriately omitted.

The cover part 70 includes a non-illustrated sound wave refraction part, and may further include a non-illustrated gap filling part. The cover part 70 is configured similarly to the cover part described in the first-seventh example embodiments, for example. The cover part 70 is formed before covering the cable core 11. In the cover part 70, the cable core attaching hole 70a is formed at the center. In the cover part 70, the slit 75 is formed in the longitudinal direction. Therefore, the cover part 80 formed beforehand can be attached to the cable core 11 from the slit 75 in an installation site.

Preferably, the cover part 70 and the cable core 11 are separately stored. The cover part 70 and the cable core 11 are usually wound around a drum and stored. Since the cable core 11 is thin compared to the cover part 70, a length that can be wound around one drum is long. When installing the cover part 70 and the cable core 11, the cover part 70 is put on the cable core 11 and installed. A method of putting the cover part 70 on the cable core 11 is not limited in particular, and for example, FIG. 14 illustrates the method of putting the cover part 70 on the cable core 11 by using the jig 90 and widening the slit 75.

The cover part with a function of refracting the sound waves described so far tends to thicken the optical fiber cable for sound wave sensing and there is a disadvantage that winding storage before installation and handling become difficult. Then, in the present example embodiment, the cable core and the cover part are separately manufactured and stored and the cover part is put on the cable core at the time of the installation.

Generally, a cable is wound around a drum to be housed, stored and transported. When the cable is thick, the length that can be wound around one drum becomes short so that cable connection work is required at an installation location in the case of being shorter than the required length. Particularly in the case of a special cable of high tension/water pressure resistance or the like, difficulty of connection work is high, an expert engineer and tools need to be brought to a cable installation site where a work environment is not arranged, and a work period becomes long. From such economical viewpoints, it is desirable that the length that can be wound around one drum is as long as possible. On the other hand, since the cover part does not need to transmit signals in the longitudinal direction, there is no need of connection and an effect is not obstructed even when there are a few joints.

Accordingly, the cable core 11 and the cover part 70 may be separately manufactured, stored and transported and the installation may be performed while putting the cover part 70 on the cable core 11 unwound from the drum. Generally, the slit 75 (split) as illustrated in FIG. 13 is made on the cover part 70 in such a case. Even when the slit 75 is made, a sound wave refracting effect of the cover part 70 is not damaged. On the other hand, smooth transmission of the sound waves at the boundary of the cable core 11 and the cover part 70 needs to be taken into consideration. It is desirable to closely attach the cable core 11 and the cover part 70 so as not to generate gaps as much as possible.

Other Example Embodiments

Note that cover parts of the individual example embodiments described above may be partially or entirely formed using a hygroscopic expansion material. The cover part partially or entirely formed using the hygroscopic expansion material is stored in a dry state. The cover part partially or entirely formed using the hygroscopic expansion material expands in volume when water is absorbed, compared to that before water absorption. Thus, when the cover part is partially or entirely formed using the hygroscopic expansion material, space needed for storage can be suppressed. However, the optical fiber cable for sound wave sensing including the cover part partially or entirely formed using the hygroscopic expansion material is installed at a location not to be dry such as underwater desirably. The optical fiber cable for sound wave sensing including the cover part partially or entirely formed using the hygroscopic expansion material may be installed on land when it is the location where the dry state does not last long.

The cover part partially or entirely formed using the hygroscopic expansion material may be manufactured and stored separately from the cable core 11, similarly to the cover part 70 illustrated in FIG. 13. When the cover part partially or entirely formed using the hygroscopic expansion material is in the dry state, the length that can be wound around one drum is long. Therefore, the space needed for storage can be suppressed.

By the invention relating to the present example embodiments described above, an optical fiber cable for sound wave sensing that uses a straight optical fiber and is capable of suppressing directivity can be provided.

Note that the present invention is not limited to the example embodiments described above, and can be appropriately changed without deviating from the object.

The present application claims priority based on Japanese Patent Application No. 2019-109437 filed on Jun. 12, 2019, and the entire disclosure is incorporated herein.

REFERENCE SIGNS LIST 1-7 Optical Fiber Cable for Sound Wave Sensing
10, 20, 30, 40, 50, 60, 70 Cover Part
70a Cable Core Attaching Hole
11 Cable Core
12, 22, 32, 42, 52, 62, 72 Sound Wave Refraction Part
12a, 22a, 32a, 42a, 42b, 52a, 62a, 72a Slope
13, 23, 33, 43, 63 Gap Filling Part
54 Reinforcement Part
75 Slit
90 Jig

What is claimed is:

1. An optical fiber cable for sound wave sensing, comprising:
a cover part that is capable of covering a straight cable core and is provided with a sound wave refraction part which refracts sound waves made incident roughly perpendicularly to a longitudinal direction of the cable core and makes the sound waves be incident diagonally to the longitudinal direction of the cable core,
wherein the cover part includes a gap filling part configured to cover the sound wave refraction part,
wherein the sound wave refraction part includes a slope inclined in relation to the longitudinal direction,
wherein a tilt angle θt is an angle formed by the slope and the cable core,
wherein an incident angle θi is an angle formed by a normal line of the slope and an advancing direction of the sound waves in the gap filling part,
wherein a critical angle θc is a lower limit of the incident angle θi causing the total reflection, wherein the tilt angle θt is smaller than the critical angle θc, and
wherein the optical cable satisfies an expression (2) below, with a sound speed of the cable core, the sound speed of the sound wave refraction part, the sound speed of the gap filling part and the sound speed of a medium that propagates the sound waves around the cover part defined as $V_f$, $V_A$, $V_B$ and $V_C$, respectively:

$$V_C \approx V_B < V_A < V_f \qquad \text{Expression (2)}.$$

2. The optical fiber cable for sound wave sensing according to claim 1, wherein the sound wave refraction part is in a string shape and is wound around the cable core.

3. The optical fiber cable for sound wave sensing according to claim 1, wherein the sound wave refraction part is in a pellet shape and is scattered in the gap filling part.

4. The optical fiber cable for sound wave sensing according to to claim 1, wherein the optical fiber cable satisfies an expression (1) below, with a sound speed of the cable core, the sound speed of the sound wave refraction part and the sound speed of a medium that propagates the sound waves around the cover part defined as $V_f$, $V_A$ and $V_C$, respectively;

$$V_C < V_A < V_f \qquad \text{Expression (1)}.$$

5. The optical fiber cable for sound wave sensing according to claim 1, wherein the cover part can be manufactured and stored separately from the cable core and is attached to the cable core before installation.

6. The optical fiber cable for sound wave sensing according to claim 1, wherein the cover part is partially or entirely formed using a hygroscopic expansion material, and expands in volume when water is absorbed compared to the volume before water absorption.

* * * * *